United States Patent [19]

Bear et al.

[11] Patent Number: 4,915,536

[45] Date of Patent: Apr. 10, 1990

[54] MODULAR YOKE END

[75] Inventors: Dee E. Bear, Roanoke; Fred Osborne, Fort Wayne; Dick E. Cleveland, Garrett, all of Ind.

[73] Assignee: Dana Corporation, Toledo, Ohio

[21] Appl. No.: 419,054

[22] Filed: Oct. 10, 1989

Related U.S. Application Data

[63] Continuation-in-part of Ser. No. 102,224, Sep. 29, 1987, abandoned.

[51] Int. Cl.⁴ .............................................. F16B 11/00
[52] U.S. Cl. .................................... 403/267; 403/265; 403/359; 403/282; 464/182
[58] Field of Search ............... 403/267, 282, 359, 265; 464/134, 182, 183

[56] References Cited

U.S. PATENT DOCUMENTS

| | | | |
|---|---|---|---|
| 3,549,739 | 12/1970 | Roche Jr. ...................... | 403/267 X |
| 4,348,874 | 9/1982 | Müller et al. .................. | 464/182 X |
| 4,376,333 | 3/1983 | Kanamaru et al. ............. | 403/359 X |
| 4,583,960 | 4/1986 | Joyner ............................ | 464/134 X |
| 4,648,616 | 3/1987 | Dickman et al. ............... | 403/265 X |
| 4,663,819 | 5/1987 | Traylor .......................... | 403/282 X |
| 4,807,351 | 2/1989 | Berg et al. ...................... | 403/282 X |
| 4,826,346 | 5/1989 | Nishiura et al. ................ | 403/267 |

Primary Examiner—Randolph A. Reese
Assistant Examiner—Carol T. Bordas
Attorney, Agent, or Firm—F. B. McDonald

[57] ABSTRACT

A modular power drive assembly includes a plain carbon driving shaft having an externally splined connection end, and a cast iron yoke having a hub thereon in fixed engagement with said connected end of the shaft. In a preferred form, the hub includes an internally splined mating portion for fixed torsional securement to the externally splined connection end of the shaft. The splined portions are sized to be press-fitted together to provide an interference fit between the splined members. A bonding adhesive is applied between the mating splined portions, and the yoke and shaft members are thereby fixedly secured against axial and rotational movement with respect to one another.

9 Claims, 2 Drawing Sheets

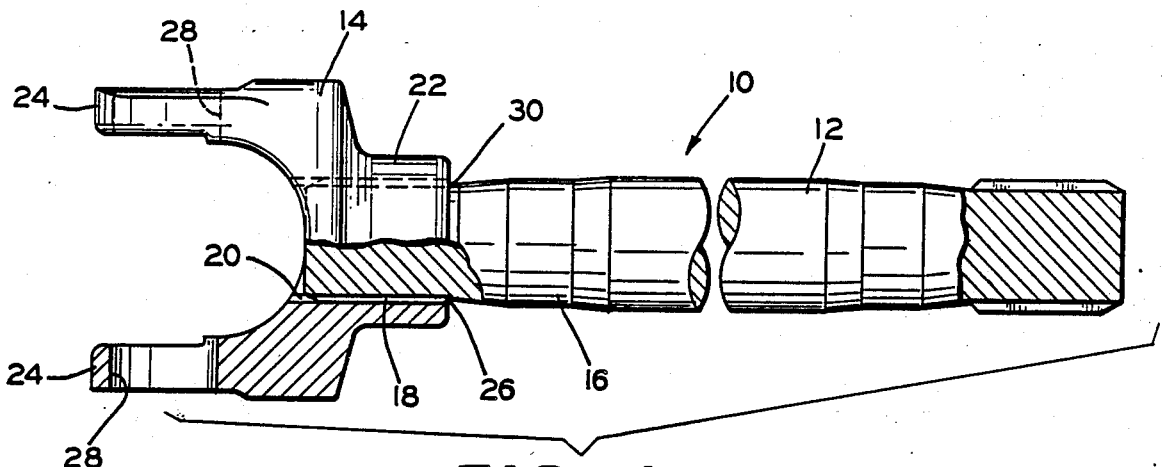
FIG. 1
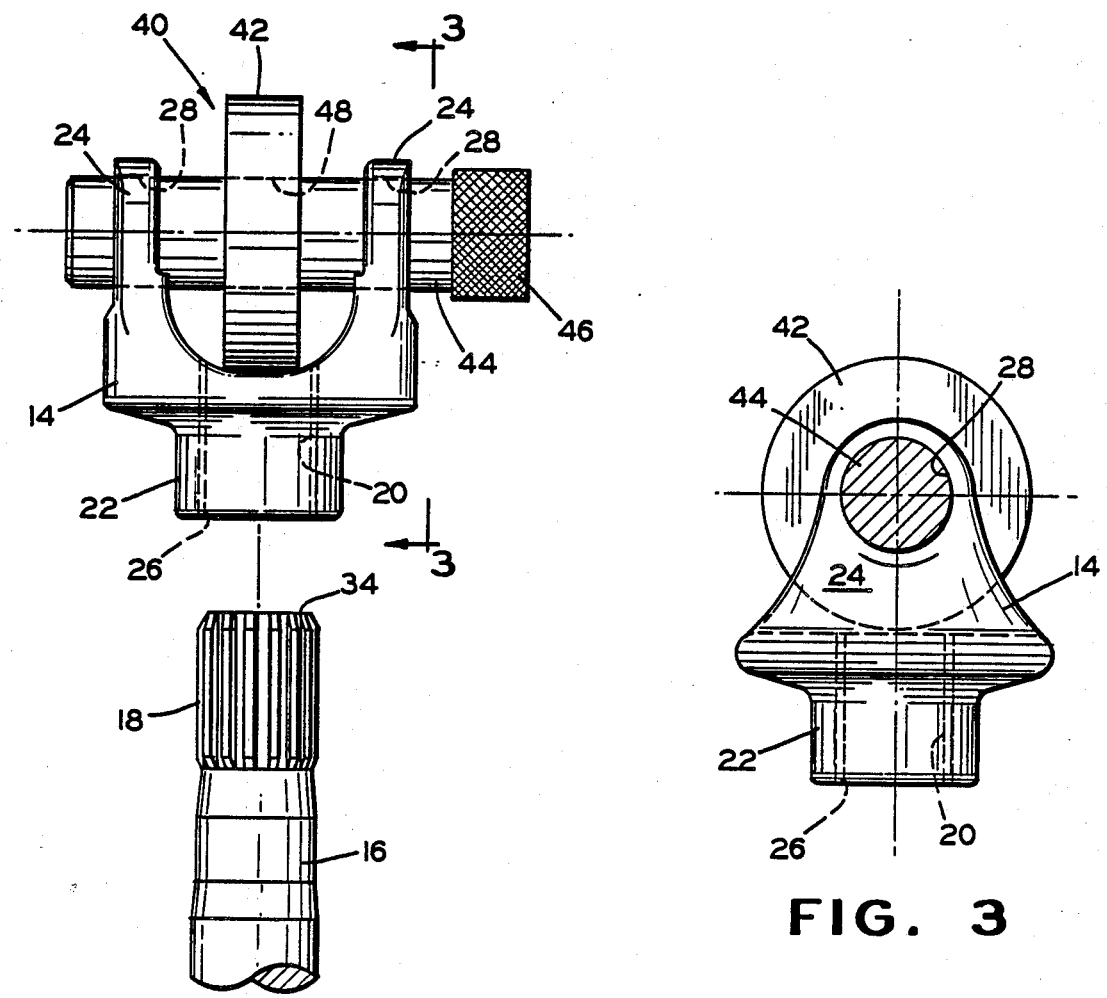
FIG. 2
FIG. 3

MODULAR YOKE END

BACKGROUND OF THE INVENTION

This is a continuation-in-part of application Ser. No. 102,224, filed Sept. 29, 1987 now abandoned.

This invention relates to power transmission assemblies of the type including yokes splined to shafts for applications in vehicular drive systems. More particularly, the invention relates to retention of yokes on shafts for purposes of insuring rigid securement of the yokes against axial and rotational relative movement with respect to the shafts.

Prior art drive assemblies involving metallic driving shafts and yokes secured thereto have primarily involved the use of forged yokes in the automotive industry. Typically, a forged steel yoke is inertia welded (friction welded) to a shaft made of a carbon alloy such as steel. As is known in the art, forging and welding processes are relatively expensive compared to various alternative procedures.

SUMMARY OF THE INVENTION

This invention provides a power drive assembly including a driving shaft having an externally splined connection end, and a non-forged yoke having an annular hub adapted for rigid securement to the connection end of the shaft.

The drive assembly of the present invention avoids the costly procedures of the prior art by eliminating forging and welding operations. A cast iron yoke is formed by broaching splines into a cast iron blank. The resultant member is considerably less expensive than a forged yoke. The splines of the yoke and shaft members are bonded together with a super-adhesive. In a preferred form, an anaerobic sealant is employed in the bonding process, which provides a strength of at least three (3) thousand pounds per square inch. The process results in substantial savings without a sacrifice in integrity of the assembly.

BRIEF DESCRIPTION OF THE DRAWING

FIG. 1 is a side view of a power drive assembly constructed in accordance with the present invention, depicted partially in cross-section.

FIG. 2 is a partial side view of the connection end of the power drive assembly during fabrication.

FIG. 3 is a view along lines 3—3 of FIG. 2.

DETAILED DESCRIPTION OF A PREFERRED EMBODIMENT

Figure 4:
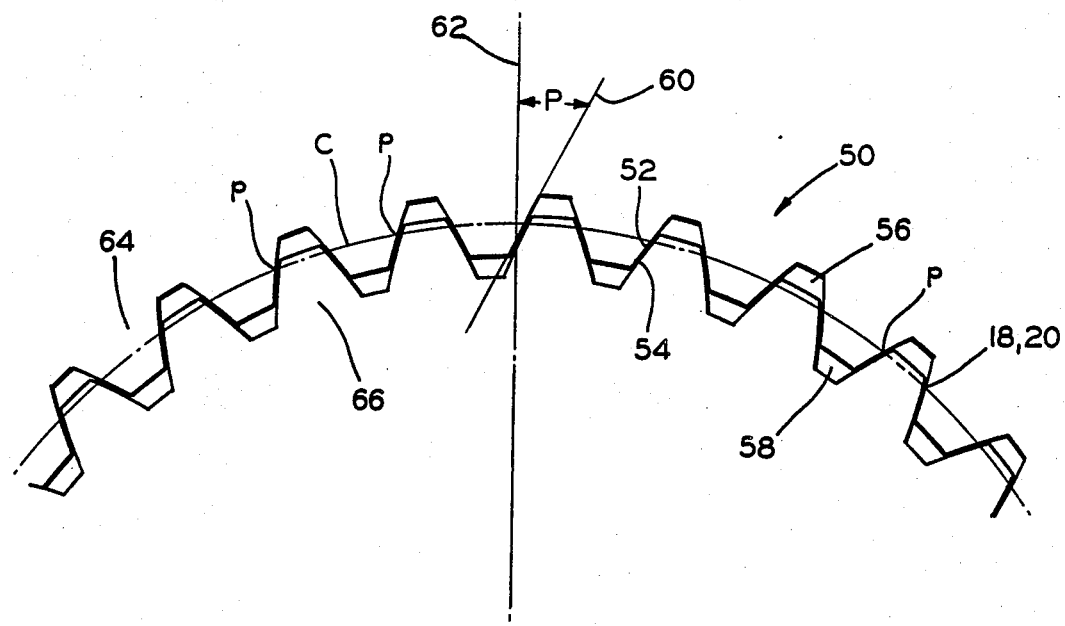
FIG. 4 is a view (enlarged) along lines 4—4 of FIG. 1, showing a portion of the splined interface between driveshaft and yoke.

Referring to the drawing figures, a vehicular power drive assembly 10 includes a carbon alloy driving shaft 12 and a yoke 14 fabricated of cast iron. The driving shaft 12 includes a connection end 16 adapted for being coupled to and for support of the yoke 14. The connection end 16 includes an externally splined surface portion 18. For purposes of coupling the yoke to the shaft 12, the yoke 14 includes an internally splined portion 20, matingly sized and adapted to be securely installed over the externally splined surface portion 18 under a one plus or minus one (1±1) thousandth of an inch press-fit tolerance to form a suitable interference fit.

The yoke 14 contains an annulus or hub 22 which includes the mating internally splined portion 20 for securement to the connection end 16 of the shaft 12. Extending from the hub 22 are a pair of yoke ears 24, which permit coupling to a vehicular wheel end, by means of a pair of cross holes 28 as will be appreciated by those skilled in this art.

A superior adhesive bond is provided via the use of an anaerobic sealant, which forms a relatively high strength adhesive for metallic members. In the preferred embodiment of the present invention, the sealant is applied in a region 30 defined by the interengaging splined portions 20 and 18 of the respective yoke and shaft members. One preferred sealant, "Permabond HHO40", manufactured and sold by National Starch and Chemical Corporation, is capable of carrying a shear loading of at least three thousand pounds per square inch. The latter nontoxic anaerobic sealant hardens upon exclusion of air, which occurs upon assembly of the parts to be mated. To the extent that the splines will handle the torsional loading, the anaerobic bond will be subjected primarily to axial forces between yoke and shaft, and will tend to fail in a shear mode. Hence, the load rating is in "shear" rather than "axial" force.

A preferred process of manufacture incorporates the steps of forming a cast iron blank, and broaching splines into the blank to form a splined yoke member 14. Matingly sized splines in the connection end 16 of the shaft 12 are rolled by a conventional process. The yoke is preferably made of a non-heat treated cast iron to avoid the forging process, while the shaft is preferably constructed of a heat treated carbon alloy. A bead of anaerobic sealant is applied to the connection end of the shaft at the outermost edge 26 of the splined portion 18. Next, installation of the yoke 14 over the splined portion 18 of the shaft will cause the sealant to spread out over the splined interface region 30 of the interengaging splined yoke and shaft portions. Finally, a curing period is provided in order to permit the bonding adhesive to satisfactorily set up. A range of three to five minutes is required for physical hardening or settling of the sealant, while a curing period of up to twenty-four hours (24) is recommended prior to any application of torque.

Referring now specifically to FIGS. 2 and 3, an assembly fixture 40 may be used to facilitate fabrication of the modular yoke end. The assembly 40 is comprised of a spacer ring 42, and a tooling pin 44 capable of extension through an aperture 48, the aperture defining the center of the ring 42. In the preferred embodiment, for convenience, the pin 44 includes a knurled handle 46, as shown in FIG. 2. Use of the assembly 40 will assure securement of the yoke 14 at a prefixed desired location along the splined portion 18 of the connection end 16 of the shaft 12.

A preferred method includes the following steps after placement of a bead of sealant at the outermost edge 26 of the portion 18:

(1) Place and hold the spacer ring 42 between the ears 24 of the yoke 14.

(2) While holding the knurled handle 46, insert the tooling pin 44 through the cross holes 28, and through the aperture 48 of the ring 42.

(3) Insert the splined portion 18 of the connection end 16 (of the shaft 12) into the mating splined portion 20 of the yoke 14, until the extremity 34 of the connection end 16 bottoms against the ring 42.

(4) Remove the tooling pin and spacer, and allow twenty-four (24) hours prior to application of torque.

Referring now specifically to FIG. 4, the interface 50 of the yoke and shaft splined portions 18,20 are depicted in an enlarged fragmentary view. It will be appreciated by those skilled in the art, that the presently preferred embodiment calls for "side fit" interference between mating splines. Such interference is designed to occur along spline sides 52, 54, between respective pitch points "p", located at the intersections of each spline tooth and the pitch circle "C". The clearances 56 and 58 at the major and minor diameters 64,66 of the splined interface 50 provide openings or clearance dimensions for admission of the anaerobic sealant. Although a side fit interference is preferred, interference fits at major or minor diameters of the interface 50 may alternatively be utilized. Under either alternative fit, adequate openings for sealant remain.

Finally, the presently preferred embodiment has a pitch angle "P" of 30 degrees as indicated. The use of a pitch angle of 30 degrees (within a tolerance of ±1) has been found to provide an optimal torsional strength of the yoke member, per given yoke diameter. Those skilled in the art will recognize that the pressure angle "P" is the angle between a line 60 tangent to an involute, and a radial line 62 which passes through the point of tangency.

Although only one presently preferred embodiment and method of assembly have been shown and described herein, the following claims are envisioned to cover numerous other alternatives which will fall within the spirit and scope thereof.

What is claimed is:

1. In a power drive assembly including a metallic driving shaft having an externally splined connection end, a metallic yoke having a hub adapted for securement to said connection end of said shaft, said hub including a mating internally splined portion for torsional securement to said externally splined connection end; an improvement comprising: the combination of (1) an interference fit between said mating splined shaft and yoke portions, and (2) a bonding adhesive applied at the interface of said mating portions, whereby said yoke and shaft members are fixedly secured against axial and rotational movement with respect to one another, said interference occurring only at select portions of said interface, wherein the remaining portions of said interface provide a clearance for admission of said bonding adhesive, and wherein said mating splines comprise a pressure angle of 30 degrees.

2. The drive assembly of claim 1 wherein said yoke is comprised of a non-heat treated cast iron material.

3. The drive assembly of claim 2 wherein said bonding adhesive applied between said mating portions of said yoke and said shaft comprises an anaerobic sealant.

4. The drive assembly of claim 3 wherein upon coupling together said yoke and shaft, said internally splined portion of said hub of said yoke and said externally splined connecting end of said shaft comprises a matingly splined interface defining a press-fit in a tolerance range of one plus or minus one (1±1) thousandths of an inch.

5. The drive assembly of claim 4 wherein said anaerobic sealant bond comprises a capacity to transmit a torsional load between said yoke and shaft members of at least three (3) thousand pounds per square inch.

6. The drive assembly of claim 5 wherein said shaft is formed of a heat treatedcarbon alloy.

7. The drive assembly of claim 6 wherein said shaft comprises a wheel end driving component.

8. The drive assembly of claim 7 wherein said interference fit occurs at the sides of said mating splines, and wherein clearances are provided at the major and minor diameters of said splines.

9. The drive assembly of claim 8 wherein said clearances at said major and minor diameters between said splines members are equal to less than seven thousandths of an inch.

* * * * *